(12) United States Patent
Grushkevich et al.

(10) Patent No.: US 7,945,209 B2
(45) Date of Patent: May 17, 2011

(54) BLOCKING OF COMMUNICATION CHANNELS

(75) Inventors: Asif Grushkevich, La Jolla, CA (US); Jagdish Gopalakrishnan, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 681 days.

(21) Appl. No.: 11/944,090

(22) Filed: Nov. 21, 2007

(65) Prior Publication Data

US 2009/0130977 A1 May 21, 2009

(51) Int. Cl.
*H04B 7/00* (2006.01)
*H04B 1/00* (2006.01)

(52) U.S. Cl. ............... 455/41.2; 455/41.3; 455/63.1; 455/63.2; 455/63.3; 455/63.4; 455/114.2; 455/552.1

(58) Field of Classification Search .......... 455/41.1–3, 455/63.1–4, 114.2, 552.1
See application file for complete search history.

(56) References Cited

U.S. PATENT DOCUMENTS

| | | | |
|---|---|---|---|
| 7,454,171 B2 * | 11/2008 | Palin et al. ................ | 455/41.2 |
| 2002/0021746 A1 * | 2/2002 | Schmidl et al. ............ | 375/132 |
| 2003/0139136 A1 * | 7/2003 | Pattabiraman .............. | 455/41 |
| 2004/0203398 A1 * | 10/2004 | Durrant ...................... | 455/41.2 |

OTHER PUBLICATIONS

Broadcom Corporation, BCM 2004 Product Brief, pp. 1-2, Mar. 30, 2004, Irvine, CA.
Broadcom Corporation, BCM 2037 Product Brief, pp. 1-2, Sep. 25, 2006, Irvine, CA.
Broadcom Corporation, BCM 2040 Product Brief, pp. 1-2, Mar. 14, 2006, Irvine, CA.
Broadcom Corporation, BCM 2042 Product Brief, pp. 1-2, Nov. 8, 2006, Irvine, CA.
Broadcom Corporation, BCM 2044 Product Brief, pp. 1-2, Jan. 8, 2007, Irvine, CA.
Broadcom Corporation, BCM 2045 Product Brief, pp. 1-2, May 10, 2007, Irvine, CA.
Broadcom Corporation, BCM 2046 Product Brief, pp. 1-2, Jun. 19, 2007, Irvine, CA.
Broadcom Corporation, BCM 2047 Product Brief, pp. 1-2, Jan. 22, 2007, Irvine, CA.
Broadcom Corporation, BCM 2048 Product Brief, pp. 1-2, May 7, 2007, Irvine, CA.
Broadcom Corporation, BCM 4325 Product Brief, pp. 1-2, Jan. 31, 2007, Irvine, CA.
Specification of the Bluetooth System, Master Table of Contents & Compliance Requirements, vol. 0, pp. 1-230 Nov. 4, 2004.

* cited by examiner

*Primary Examiner* — Wen W Huang
(74) *Attorney, Agent, or Firm* — Brake Hughes Bellermann, LLP

(57) ABSTRACT

A system may include a scanning module that is arranged and configured to scan communication channels for channel interference, a channel assessor module that is arranged and configured to determine a type of channel interference present on one or more of the communication channels, and a blocking module that is arranged and configured to selectively block one or more of the communication channels based on the type of channel interference.

20 Claims, 5 Drawing Sheets

BLOCKING OF COMMUNICATION CHANNELS

TECHNICAL FIELD

This description relates to blocking of communication channels.

BACKGROUND

One device may communicate with another device using a communication protocol. The communication protocol may include a procedure for the two devices to establish a connection. After establishing a connection, the devices may follow a protocol for sending communication traffic between the devices. For example, two Bluetooth®-enabled devices, such as a cell phone and an ear piece, may communicate with one another using the Bluetooth protocol. The Bluetooth protocol may include a procedure for the two devices to establish the connection. After establishing a connection, the devices may follow the Bluetooth protocol for sending communication traffic between the devices.

SUMMARY

The details of one or more implementations are set forth in the accompanying drawings and the description below. Other features will be apparent from the description and drawings, and from the claims.

DETAILED DESCRIPTION

In some communication protocols, the protocol may call for the use of multiple communication channels to enable the devices to exchange communication traffic. Thus, a device may use one or more communication channels to communicate with one or more other devices. The devices may need a minimum number of communication channels available to conduct communications. It may not be uncommon for one or more of the communication channels to experience interference on the channel such that it may not be desirable for the device to use that channel when exchanging communication traffic with another device. The devices may take steps to block one or more of the communication channels that are experiencing interference. If too many channels are blocked due to some type of interference, then the devices may not be able to communicate and/or may experience a reduction in the quality of the communications.

In one exemplary implementation, the Bluetooth protocol may be used by one or more devices to communicate with each other. For example, one device (e.g., a master device) may establish communications with another device (e.g., a slave device) using the Bluetooth protocol. The two devices may use adaptive frequency hopping (AFH) to exchange information regarding good and bad channels and/or to exchange communications.

For example, the Bluetooth protocol may operate in the industrial, scientific and medical (ISM) band at 2.4 GHz and may use multiple (e.g., 79) communication channels in this band. The master device may provide a command to the slave device that indicates which communication channels are available to use in the AFH scheme. The command may provide an indication of allowed channels and/or of blocked channels.

It is possible that one or more of the multiple channels in the Bluetooth operating band experience channel interference, including channel interference due to a wireless local area network (WLAN), which also may operate in the ISM band at frequencies that may overlap with the Bluetooth frequencies. A device may take measures to block one or more of the communication channels that are experiencing channel interference. If too many channels are blocked due to some type of interference, then the devices may not be able to communicate and/or may experience a reduction in the quality of the communications. For example, the Bluetooth protocol may require a minimum of 20 available channels in order for two devices to communicate using the protocol. The device may have to arbitrarily reclaim some of the blocked channels so that communication traffic may be exchanged. However, the arbitrary reclaiming of previously blocked channels may not be a desirable process and may unnecessarily use device resources and power. Also, reclaimed channels may still have significant interference on the channel, which may cause degraded communications.

Figure 1:
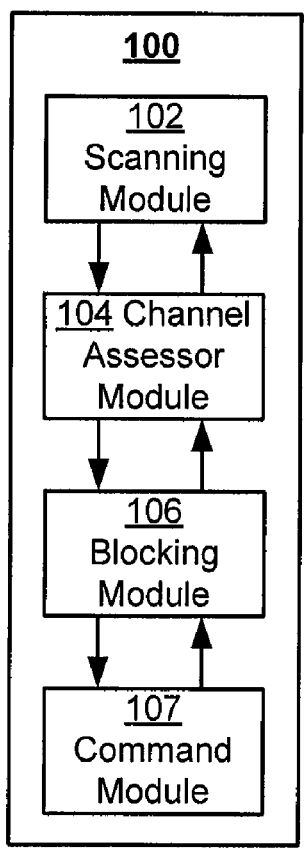
FIG. 1 is an exemplary block diagram of a system for blocking communication channels.

Referring to FIG. 1, a system 100 for selectively blocking communication channels may include a scanning module 102, a channel assessor module 104, a blocking module 106 and a command module 107. In general, system 100 may be used to detect communication channels that may have channel interference on them and to selectively block communication channels from use between devices based on the type of channel interference experienced on the specific channels. The scanning module 102 may be arranged and configured to scan communication channels for interference. The channel assessor module 104 may be arranged and configured to determine a type of channel interference that may be present on one or more of the communication channels. The blocking module 106 may be arranged and configured to selectively block one or more of the communication channels based on the type of channel interference. The command module 107 may be arranged and configured to generate a command that includes the blocked communication channels and to communicate the command to another device.

In one exemplary implementation, the system 100 may be arranged and configured to operate in many different types of devices 180. For example, system 100 may be arranged and configured to operate in a cellular phone, a smart phone, an MP3 player, an iPod® player, a personal digital assistant (PDA), a mobile handset, other types of devices, and/or in devices that include a combination of these types of devices. These one or more devices 180 may be arranged and configured to communicate with other devices using a communication protocol. For example, these devices 180 may use a Bluetooth protocol to communicate with one another.

In one exemplary implementation, the system 100 may be arranged and configured to be implemented as an integrated circuit. The integrated circuit may be arranged and configured to operate in many different types of devices 180. For example, system 100 may be arranged and configured to operate in a cellular phone, a smart phone, an MP3 player, an iPod® player, a personal digital assistant (PDA), a mobile handset, other types of devices, and/or devices that include any combination of these types of devices. The integrated circuit may be arranged and configured to be implemented as a single chip solution that operates in the different types of applications described above. The components of system 100 may be implemented on one or more integrated circuits and in some instances, one or more components may be implemented on one integrated circuit and the remaining components may be implemented on a different integrated circuit, with the two integrated circuits capable of communicating with each other.

The scanning module 102 may be arranged and configured to scan communication channels for channel interference. The scanning module 102 may scan the communication channels by checking each potential channel that the device 180 may use to communication with other devices to determine whether or not those channels are free from interference or at least only contain a minimal amount of interference. The scanning module 102 may scan the communication channels by automatically going through each potential frequency and determining whether channel interference is present on that particular frequency by measuring a signal strength (e.g., received signal strength indication (RSSI)). Channel interference may be present on a particular channel if the signal strength (e.g., RSSI) on the specific channel is equal to and/or below a signal strength threshold.

The information obtained by the scanning module 102 regarding any channel interference may be saved for use by the other components of system 100 and/or device 180. For example, the scanning module 102 may save information regarding which channels may be available for use and/or which channels may have interference. The scanning module 102 also may save the signal strength (e.g., RSSI) for each communication channel.

The scanning module 102 may scan different types of communication channels for channel interference. The communication channels that may be scanned are not limited to any particular frequency spectrum or group of communication channels. In one exemplary implementation, the communication channels may include the Bluetooth frequency spectrum in the ISM band.

In one exemplary implementation, the scanning module 102 may perform periodic scans of the communication channels for any channel interference. The periodic scans may be configurable such that the periodicity of the scans may be changed. The scans may be performed before, during and/or after device 180 has established a connection with one or more other devices.

The information from the scanning module 102 may be used by the channel assessor module 104 to determine a type of the channel interference that may be present on one or more of the communication channels. The types of channel interference may include random noise, signals from other devices operating in or near the same channel, and other sources of interference. In one exemplary implementation, one type of channel interference may include interference caused by WLANs, including WLAN-A, WLAN-B, WLAN-G, and WLAN-N, which may correspond to 802.11a, 802.11b, 802.11g, and 802.11n, respectively. More specifically, for example, WLAN interference may interfere with one or more Bluetooth communication channels because WLANs may operate on the same channel frequencies as one or more the Bluetooth communication channels. For instance, WLAN-B and WLAN-G may operate on between 22 and 23 channels, including channels that experience sideband interference, which may overlap with multiple Bluetooth communication channels. WLAN-N may operate on between 42 and 43 channels, including channels that experience sideband interference, which also may overlap with multiple Bluetooth communication channels.

The channel assessor module 104 may determine the type of channel interference, including distinguishing between WLAN channel interference and other types of channel interference. For example, the channel assessor module 104 may receive information from the scanning module 102 regarding which communication channels may include interference, including a signal strength for each channel. The channel assessor module 104 may determine that WLAN channel interference is present on multiple communication channels if the information from the scanning module 102 indicates that a consecutive block of channels has channel interference and/or that the block of channels are on channels on which a WLAN may operate. The channel assessor module 104 may determine that other type of channel interference is present on a channel if the information from the scanning module 102 indicates that there are random, non-consecutive blocks that may have channel interference.

Information regarding the type of channel interference may be saved by the channel assessor module 104. The information may be used by the blocking module 106 to selectively block one or more of the communication channels based on the type of the channel interference. In one exemplary implementation, the blocking module 106 may selectively block only communication channels that have WLAN channel interference.

The command module 107 may be arranged and configured to generate a command that includes the blocked communication channels and to communicate the command to another device. In this manner, both device 180 and another device will both know which communication channels are available and which communication channels are not available to exchange communication traffic. For example, if device 180 and another device are using the Bluetooth protocol, then the command module 107 may generate a command that indicates which of the 79 channels are clear for use in the AFH communication scheme and which of the 79 channels are not clear for use in the AFH communication scheme. In one exemplary implementation, the command module 107 may use the link manager protocol (LMP) to communicate the command to another device.

The command generated by the command module 107 may be generated in different forms. For instance, the command may include a listing of only the allowed communication channels. Alternatively, the command may include a listing of only the blocked communication channels. Alternatively, the command may include a listing of both the allowed and the blocked communication channels. The command structure may be a message using a single bit for each channel with binary indicators to indicate whether a channel is available or whether a channel is blocked. For example, in Bluetooth communications, the command may be a message that includes a bit for each of the 79 potential channels with a 1 in the message indicating that a particular channel is available and a 0 indicating that a particular channel is blocked.

In one exemplary implementation, the communication channels may include Bluetooth communication channels and device 180 may be a Bluetooth-enabled device. The scanning module 102 may scan the Bluetooth communication channels for any channel interference. The channel assessor module 104 may determine that type of channel interference that may be present on one or more of the Bluetooth communication channels. The blocking module 106 may selectively block one or more of the Bluetooth communication channels based on the type of the channel interference.

In another exemplary implementation, the blocking module 106 may selectively block one or more of the Bluetooth communication channels that have WLAN channel interference present on them. In yet another exemplary implementation, the blocking module 106 may selectively block only the Bluetooth communication channels that have WLAN interference present on them.

By selectively blocking channels, the system 100 can ensure that enough communication channels are still available for communications and that not too many communication channels are blocked unnecessarily. In this manner, the device 180 may not have to reclaim any communication channels so that communications may be exchanged.

In one exemplary implementation, the communication channels may include Bluetooth communication channels and device 180 may be a Bluetooth-enabled device. The scanning module 102 may scan the Bluetooth communication channels for any channel interference. The channel assessor module 104 may determine a type of channel interference that may be present on one or more of the Bluetooth communication channels, where the type of channel interference may include WLAN channel interference and other channel interference. The blocking module 106 may selectively block the one or more Bluetooth communication channels with the WLAN channel interference present and allow communication on the Bluetooth communication channels that may have other types of channel interference. The command module 107 may generate a command that includes the blocked and allowed Bluetooth communication channels and may communicate that command to another device.

Figure 2:
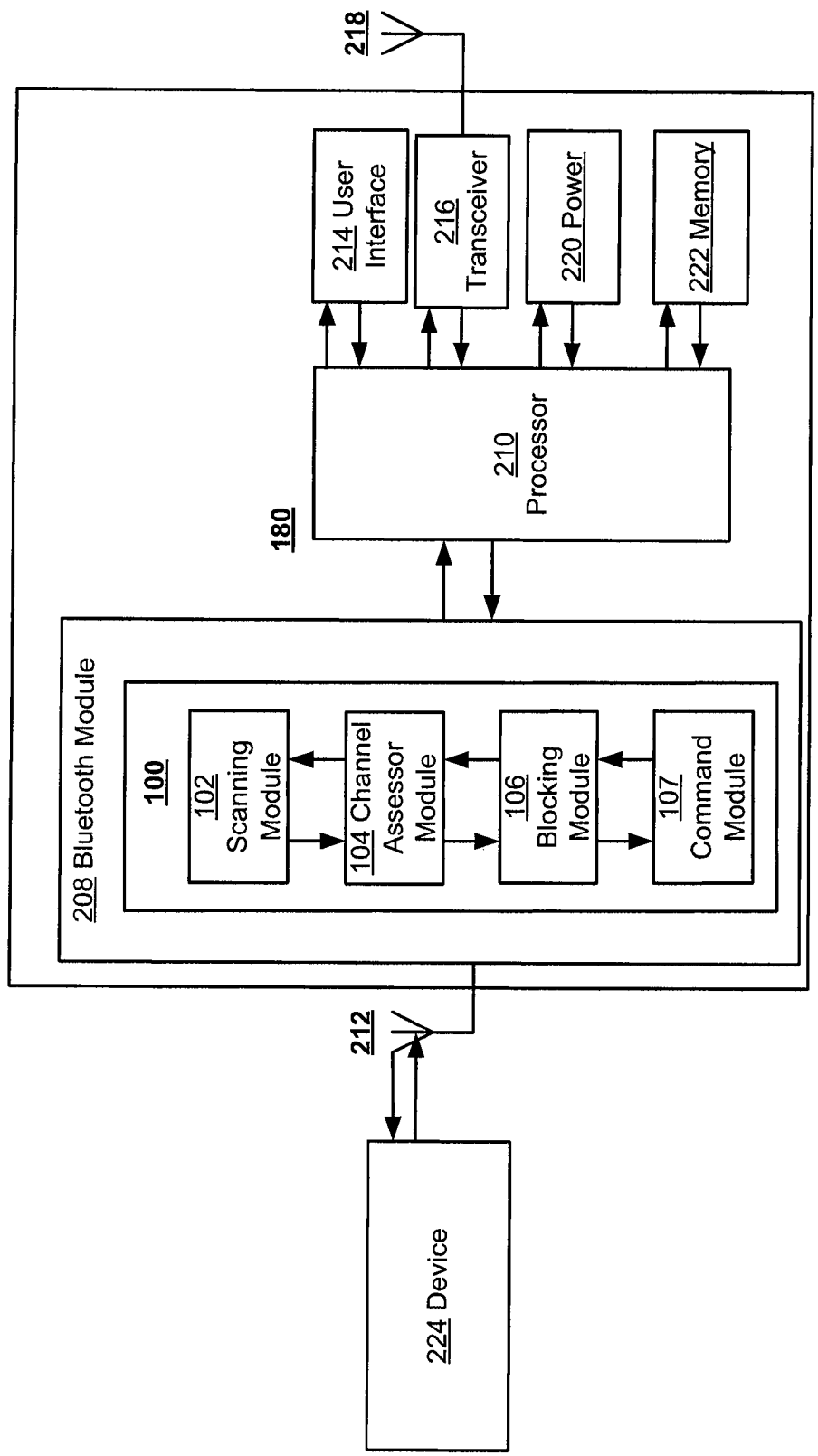
FIG. 2 is an exemplary block diagram of an exemplary implementation of the system of FIG. 1.

Referring also to FIG. 2, system 100 may be included with a Bluetooth module 208 having an antenna 212. The Bluetooth module 208 may be included as a component of the device 180. Device 180 also may include a processor 210, a user interface 214, a transceiver 216 having an antenna 218, a power module 220 and a memory module 222. Device 180 may be arranged and configured to communicate with device 224 using one or more communication protocols including, for example, the Bluetooth protocol. Device 180 may include the types of devices discussed above with respect to FIG. 1 including any type of Bluetooth-enabled device. Device 224 also may include the same types of devices discussed above with respect to FIG. 1 including any Bluetooth-enabled device.

The Bluetooth module 208 may include system 100 as well as other Bluetooth-related components (not shown) for the operation of the Bluetooth functionality. The Bluetooth module 208 may enable the device 180 to communicate with device 224 and other Bluetooth-enabled devices using the Bluetooth protocol through antenna 212. System 100 and its components include the functionality and features described above with respect to FIG. 1.

The processor 210 may be arranged and configured to control the functioning and overall operation of the device 180, including the other components of the device 180. The processor 210 may include application specific firmware, operating instructions, and/or other software to control the operation of the device 180.

The user interface 214 may be arranged and configured to accept input from a user and to convey information to a user through a display or otherwise. In a Bluetooth-enabled cellular phone, for example, the user interface may include keys, buttons, a touch screen, a stylus for use with a screen, and/or other input interfaces. Interaction with the user interface may include opening a flip lid to the cellular phone or otherwise activating the cellular phone.

The transceiver 216 may be arranged and configured to communicate with other devices through antenna 218 using one or more communication protocols. For example, the transceiver 216 may include a cellular transceiver that is arranged and configured to communicate cellular messages with other devices. Additionally and/or alternatively, the transceiver 216 may include a frequency modulation (FM) transceiver that may be arranged and configured to transmit and receive messages using frequency modulation.

The power module 220 may be arranged and configured to provide power to the device 180 and its components. The power module 220 may include a source of power such as, for example, one or more batteries.

The memory module 222 may be arranged and configured to store information to be used by other components of the device 180. For example, the memory module 222 may store information collected by the scanning module 102 relating to channel interference, including signal strength (e.g., RSSI), in one or more of the communication channels. The memory module 222 also may store information determined by the channel assessor module 104 relating to the type of channel interference. The memory module 222 also may store any type of configuration information, including any configurable settings, relating to system 100 and/or the device 180.

In this exemplary implementation of system 100 as illustrated in FIG. 2, the device 180 may function as a master device and/or as a slave device with respect to the Bluetooth protocol. Likewise, if device 224 is a Bluetooth-enabled device, then device 224 may function as a master device and/or as a slave device with respect to the Bluetooth protocol.

In one exemplary implementation, device 180 may communicate with device 224 using the Bluetooth protocol. The scanning module 102 may scan the Bluetooth communication channels for any channel interference. The scanning module 102 may save the information relating to any channel interference in the memory module 222. The channel assessor module 104 may use the information obtained during the scan by the scanning module 102 to determine a type of channel interference that may be present on any of the communication channels. For example, if there is channel interference on a group of consecutive channels, then the channel assessor module 104 may determine that the type of channel interference is WLAN channel interference.

The blocking module 106 may selectively block one or more of the Bluetooth communication channels based on the type of channel interference. For instance, if the channel assessor module 104 determines that there is WLAN channel interference on a group of channels, then the blocking module 106 may block those channels based on the type of channel interference. The command module 107 may generate a command that includes information about which communication channels are blocked and/or which communication channels are cleared. The command module 107 may communicate the command to the device 224. Then, device 180 and device 224 both know which Bluetooth communication channels to use as part of the AFH scheme. In one exemplary implementation, the blocking module 106 may block only the Bluetooth communication channels that have WLAN channel interference.

In one exemplary implementation, the channel assessor module 104 may determine that the type of channel interference on the Bluetooth communication channels is random noise channel interference. The blocking module 106 may selectively allow communications on the communication channels on which the random noise channel interference is present. In this manner, the device 180 may not have to reclaim any blocked communication channels because the channels that have random noise channel interference are not blocked. By not blocking these channels, communications between device 180 and device 224 is not likely to be perceptibly degraded.

In another exemplary implementation, processor 210, which also may be referred to as a host, may send a command to the channel assessor module 104 indicating that WLAN channel interference is present on a group of communication channels. The channel assessor module 104 may receive the command from the host and the blocking module 106 may selectively block the communication channels that have WLAN channel interference.

Additionally and/or alternatively, the device 224 may generate and send a command to the device 180 indicating channels that have channel interference. The channel assessor module 104 may determine the type of channel interference based on information provided by the device 224 in the command. The blocking module 106 may selectively block one or more of the communication channels based on the type of channel interference. The command module 107 may generate a command that indicates which channels are blocked and/or which channels are clear and communicate that command to device 224. In this exemplary implementation, the device 180 may be the master device and the device 224 may be the slave device.

In one exemplary implementation, the channel assessor module 104 may determine the types of channel interference that may be present on the communication channels based on input from the scanning module 102, another device, such as the device 224, and/or from the host, such as a host application being executed on the processor 210. The blocking module 106 may then selectively block one or more of the communication channels based on the type of channel interference.

Figure 3A:
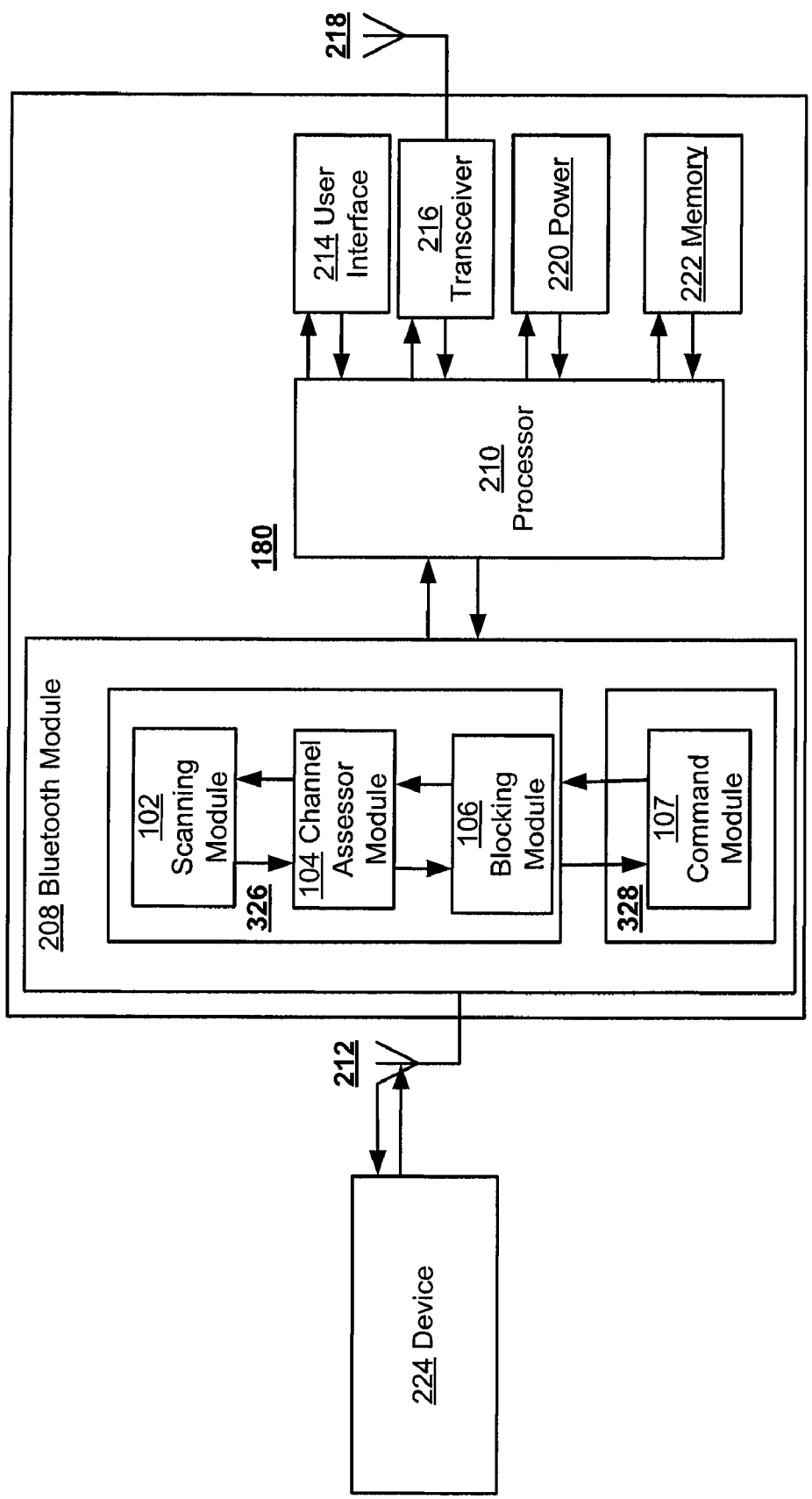
FIG. 3A is an exemplary block diagram of an exemplary implementation of the system of FIG. 1.

Referring to FIG. 3A, the Bluetooth module 208 may include an upper stack 326 and a lower stack 328. In one exemplary implementation, the upper stack 326 may include the scanning module 102, the channel assessor module 104, and the blocking module 106. The lower stack 328 may include the command module 107. In other exemplary implementations, the upper stack 326 may be referred to as a host and the lower stack 328 may be referred to as a controller. In other exemplary implementations, the different modules may be grouped together in different combinations in the upper stack 326 or the lower stack 328. In yet other exemplary implementations, all of the modules may be located in either the upper stack 326 or the lower stack 328. In the example of FIG. 3A, both the upper stack 326 and the lower stack 328 are a part of the Bluetooth module 208.

The upper stack 326 and/or the lower stack 328 may include additional Bluetooth-related components (not shown) including, for example, a channel manager, a logical link control and adaption protocol (L2CAP) resource manager, a device manager, a link manager, a baseband resource manager, a link controller, and/or a radio frequency block. In one exemplary implementation, link manager protocol (LMP) commands may be used to communicate between the upper stack 326 and the lower stack 328. Additionally, LMP commands may be used to communicate between the different modules.

Figure 3B:
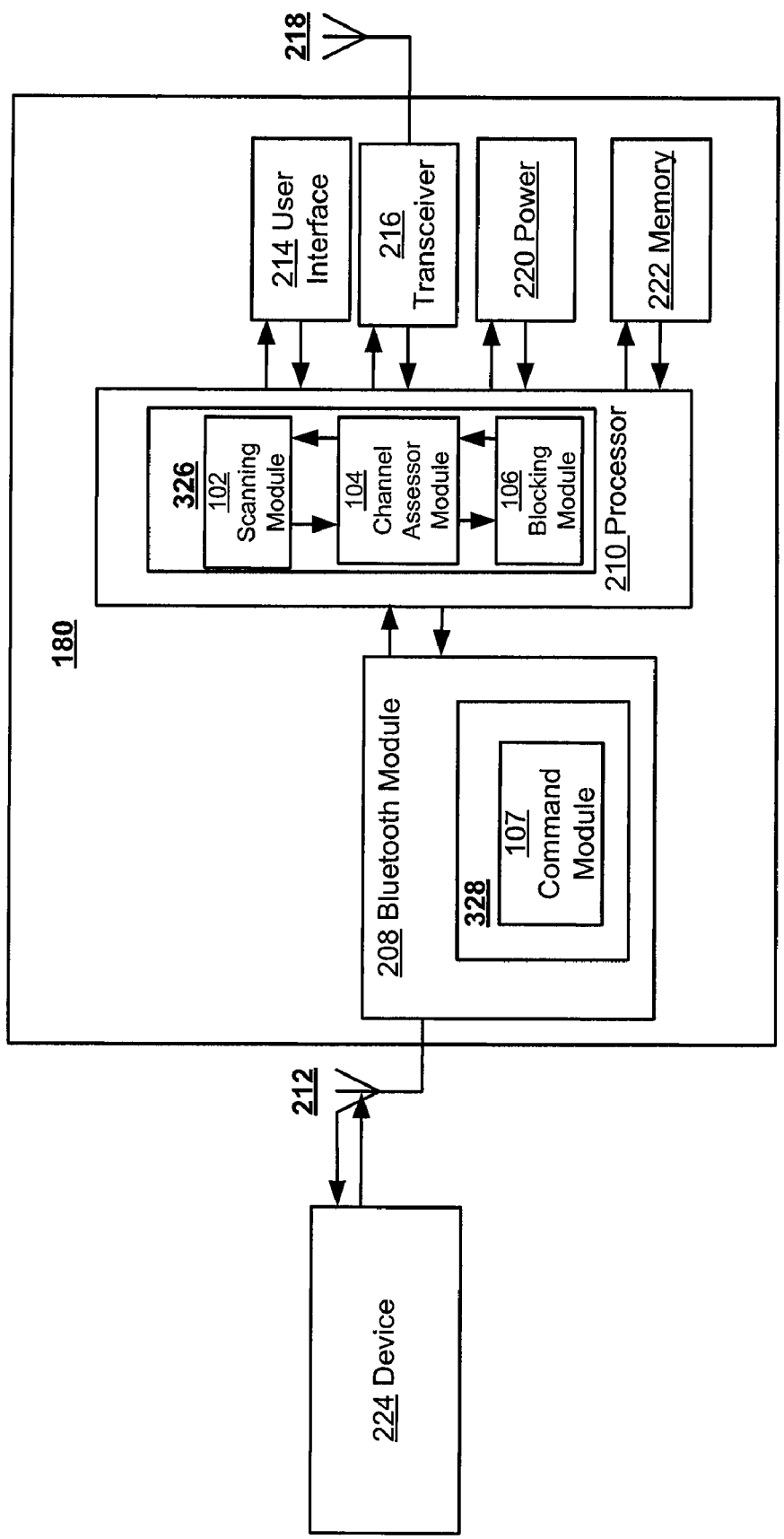
FIG. 3B is an exemplary block diagram of an exemplary implementation of the system of FIG. 1.

Referring to FIG. 3B, in another exemplary implementation, the processor 210 may include the upper stack 326, where the upper stack 326 may include the scanning module 102, the channel assessor module 104, and the blocking module 106. The Bluetooth module 208 may include the lower stack 328, where the lower stack 328 may include the command module 107. Although FIG. 3B illustrates the upper stack 326 as including the scanning module 102, the channel assessor module 104, and the blocking module 106 and the lower stack 328 as including the command module 107, these modules may be arranged in different combinations as part of the upper stack 326 and the lower stack 328, or all included as part of the upper stack 326 or all included as part of the lower stack 328.

Figure 4:
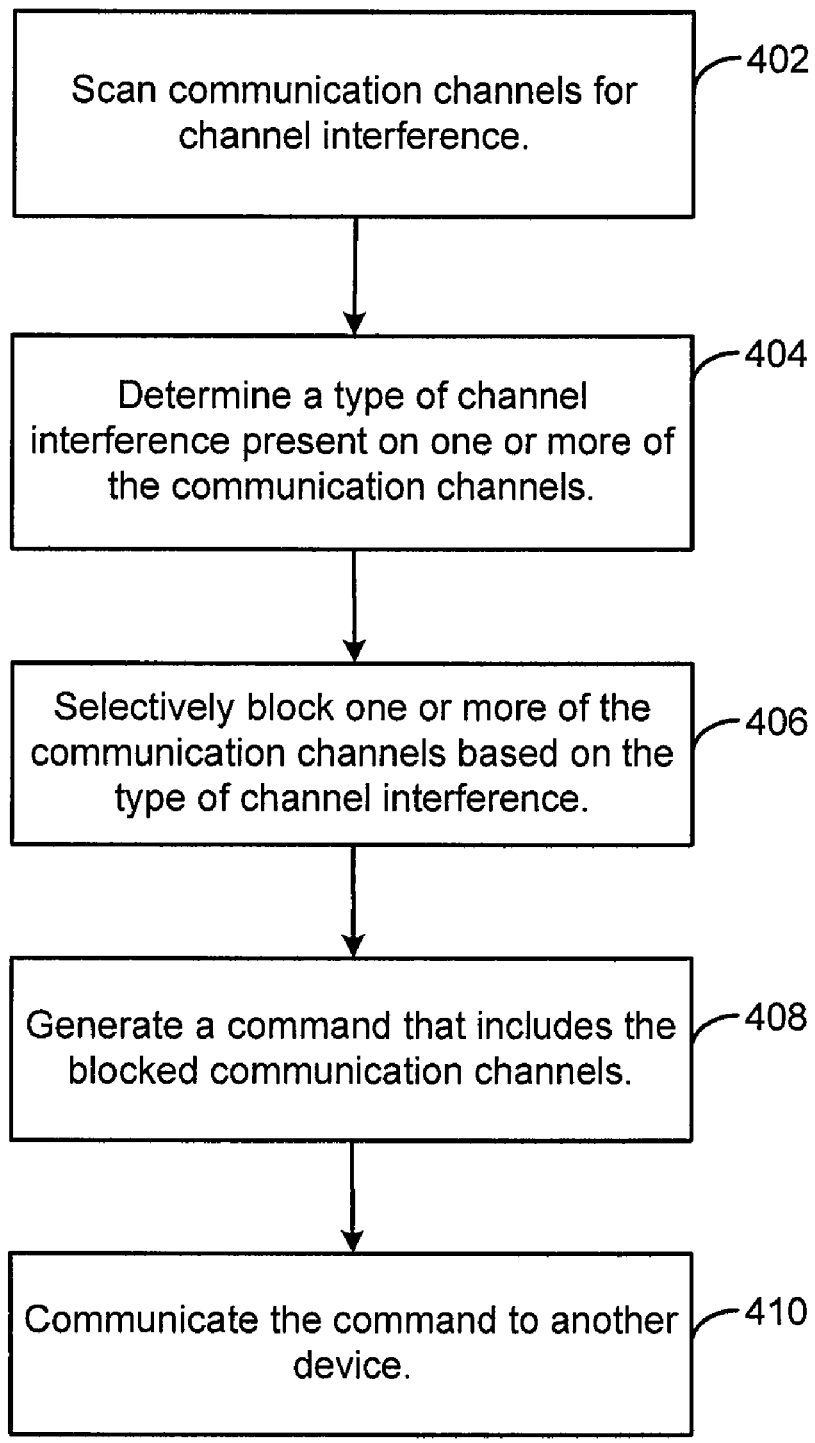
FIG. 4 is an exemplary flowchart illustrating example operations of the system of FIG. 1.

Referring to FIG. 4, a process 400 is illustrated for selectively blocking communication channels. Process 400 may include scanning communication channels for channel interference (402), determining a type of channel interference present on one or more of the communication channels (404), and selectively blocking one or more of the communication channels based on the type of channel interference (406). Process 400 also may include generating a command that includes the blocked communication channels (408) and communicating the command to another device (410).

In one exemplary implementation, the scanning module 102 of FIGS. 1, 2 and 3 may scan communication channels for channel interference (402). The scanning module 102 may be configured to scan the communication channels on a periodic basis, where the periodic basis is configurable. The communication channels may include Bluetooth communication channels such that scanning the channels (402) includes scanning the Bluetooth communication channels for channel interference.

The channel assessor module 104 of FIGS. 1, 2, and 3 may determine the type of channel interference (404). In one exemplary implementation, the type of channel interference may include WLAN channel interference such that determining the type of the channel interference (404) may include determining whether or not WLAN channel interference is present on one or more of the communication channels, including Bluetooth communication channels.

The blocking module 106 of FIGS. 1, 2, and 3 may selectively block one or more of the communication channels based on the type of channel interference (406). In one exemplary implementation, the type of channel interference may include WLAN channel interference and other interference. The blocking module may selectively block only the communication channels (e.g., one or more of the Bluetooth communication channels) that have WLAN channel interference.

The command module 107 of FIGS. 1, 2, and 3 may be configured to generate the command that includes the blocked communication channels (408) and to communicate the command to another device (e.g., device 224) (410).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system, comprising:
   a scanning module that is arranged and configured to scan Bluetooth communication channels for channel interference;
   a channel assessor module that is arranged and configured to determine a type of channel interference present on one or more of the Bluetooth communication channels, including determining whether wireless local area network (WLAN) channel interference is present on one or more of the Bluetooth communication channels and distinguishing between WLAN channel interference and other types of channel interference; and
   a blocking module that is arranged and configured to selectively block only the Bluetooth communication channels that have WLAN interference present.

2. The system of claim 1 wherein the scanning module is arranged and configured to scan the Bluetooth communication channels on a periodic basis for channel interference.

3. The system of claim 1 wherein:
   the channel assessor module is arranged and configured to receive a command from a host indicating that WLAN channel interference is present on one or more of the Bluetooth communication channels, and
   the blocking module is arranged and configure to selectively block the Bluetooth communication channels indicated in the command.

4. The system of claim 1 wherein the blocking module is arranged and configured to selectively allow communications on the Bluetooth communication channels that have channel interference based on the type of the channel interference.

5. The system of claim 1 wherein:
   the type of channel interference includes random noise interference such that the channel assessor module is arranged and configured to determine whether the random noise interference is present; and
   the blocking module is arranged and configured to selectively allow communications on the Bluetooth communications channels where the random noise interference is present.

6. The system of claim 1 further comprising a command module that is arranged and configured to generate a command that includes the blocked Bluetooth communication channels and to communicate the command to another device.

7. The system of claim 1 wherein the scanning module, the channel assessor module and the blocking module are included in a Bluetooth-enabled device.

8. The system of claim 1 wherein the scanning module, the channel assessor module and the blocking module are included in a Bluetooth-enabled cellular phone.

9. A system, comprising:
   a scanning module that is arranged and configured to scan Bluetooth communication channels for channel interference;
   a channel assessor module that is arranged and configured to determine a type of channel interference present on the Bluetooth communication channels, wherein the type of channel interference includes WLAN channel interference and other channel interference, and is arranged and configured to distinguish between WLAN channel interference and other types of channel interference;
   a blocking module that is arranged and configured to selectively block only the one or more Bluetooth communication channels with WLAN channel interference present and to allow communications on the Bluetooth communication channels with other channel interference present; and
   a command module that is arranged and configured to generate a command that includes the blocked and allowed Bluetooth communication channels and to communicate the command to another device.

10. The system of claim 9 wherein the scanning module is arranged and configured to scan the Bluetooth communication channels on a periodic basis for channel interference.

11. The system of claim 9 wherein the channel assessor module is arranged and configured to receive a command from a host indicating that WLAN channel interference is present on one or more of the Bluetooth communication channels.

12. The system of claim 9 wherein:
the other channel interference comprises random noise interference, and
the blocking module is arranged and configured to selectively allow communications on the Bluetooth communication channels having random noise interference present.

13. The system of claim 9 wherein the scanning module, the channel assessor module, the blocking module and the command module are implemented in a Bluetooth-enabled device.

14. A method for blocking communication channels, the method comprising:
scanning Bluetooth communication channels for channel interference;
determining a type of channel interference present on one or more of the Bluetooth communication channels, including determining whether wireless local area network (WLAN) channel interference is present on one or more of the Bluetooth communication channels and distinguishing between WLAN channel interference and other types of channel interference; and
selectively blocking only one or more of the Bluetooth communication channels that have WLAN interference present based on the type of channel interference.

15. The method as in claim 14 further comprising:
generating a command that includes the blocked Bluetooth communication channels; and
communicating the command to another device.

16. The method as in claim 14 further comprising scanning the Bluetooth communication channels on a periodic basis for channel interference.

17. The method as in claim 14 further comprising receiving a command from a host indicating that WLAN channel interference is present on one or more of the Bluetooth communication channels.

18. The method as in claim 14 wherein the scanning, the determining and the selectively blocking are implemented in a Bluetooth-enabled device.

19. The method as in claim 14 wherein the scanning, the determining and the selectively blocking are implemented in a Bluetooth-enabled cellular phone.

20. The method as in claim 14 further comprising:
determining random noise interference is present on one or more of the Bluetooth communication channels; and
selectively allowing communications on the Bluetooth communication channels having random noise interference present.

* * * * *

UNITED STATES PATENT AND TRADEMARK OFFICE
CERTIFICATE OF CORRECTION

PATENT NO.         : 7,945,209 B2                                  Page 1 of 1
APPLICATION NO.    : 11/944090
DATED              : May 17, 2011
INVENTOR(S)        : Asif Grushkevich et al.

It is certified that error appears in the above-identified patent and that said Letters Patent is hereby corrected as shown below:

On first page, in field (56), under "OTHER PUBLICATIONS", in column 2, line 22, delete "pp. 1-230" and insert -- pp. 1-1230 --, therefor.

In column 12, line 3, in claim 14, after "present" delete "based on the type of channel interference".

Signed and Sealed this
Twenty-fourth Day of July, 2012

David J. Kappos
*Director of the United States Patent and Trademark Office*